(12) United States Patent
Raddin et al.

(10) Patent No.: US 7,347,503 B2
(45) Date of Patent: Mar. 25, 2008

(54) BICYCLE WHEEL SPINNER ASSEMBLY

(76) Inventors: James C. Raddin, 897 Highpoint Dr., Springboro, OH (US) 45066; Matthew D. Bell, 2152 Williams Ave., Cincinnati, OH (US) 45212

( * ) Notice: Subject to any disclaimer, the term of this patent is extended or adjusted under 35 U.S.C. 154(b) by 72 days.

(21) Appl. No.: 10/711,371

(22) Filed: Sep. 14, 2004

(65) Prior Publication Data

US 2006/0055230 A1    Mar. 16, 2006

(51) Int. Cl.
*B60B 7/20* (2006.01)

(52) U.S. Cl. .................. 301/37.25; 301/37.41

(58) Field of Classification Search ............ 301/37.25, 301/37.41, 37.101; 40/587
See application file for complete search history.

(56) References Cited

U.S. PATENT DOCUMENTS

| | | | | |
|---|---|---|---|---|
| 2,997,344 A * | 8/1961 | Whiteman | ............... | 301/37.25 |
| 3,158,946 A | 12/1964 | Upchurch | | |
| 3,987,409 A * | 10/1976 | Freeman | ................... | 340/432 |
| 4,121,851 A | 10/1978 | Finkenbiner | | |
| 4,209,230 A * | 6/1980 | Perkins | ..................... | 359/523 |
| 6,554,370 B2 | 4/2003 | Fowlkes | | |
| 6,637,830 B1 | 10/2003 | Burgess | | |
| 6,655,061 B1 | 12/2003 | Good | | |
| 6,820,943 B2 * | 11/2004 | Good | ................... | 301/37.101 |
| 2003/0075971 A1 | 4/2003 | Geisel | | |
| 2004/0075332 A1 | 4/2004 | Good | | |
| 2005/0146201 A1* | 7/2005 | Cavazos et al. | ......... | 301/37.25 |
| 2005/0146203 A1* | 7/2005 | Lin | ........................ | 301/37.25 |
| 2006/0061208 A1* | 3/2006 | Fultz et al. | .............. | 301/37.25 |

* cited by examiner

*Primary Examiner*—Russell D. Stormer
(74) *Attorney, Agent, or Firm*—Lafkas Patent LLC; David M. Lafkas

(57) ABSTRACT

The present invention is a multi-disc spinning assembly for a bicycle having a narrow flange hub, a first disc, a second disc and a set of bearings. The narrow flange hub supports a wheel. The first disc comprises a series of brackets around the periphery of a backside of the first disc for mounting the first disc to a rim of the wheel; and one or more openings. The second disc is located between the first disc and a flange of the narrow flange hub. The set of bearings connects to the second disc and the narrow flange hub, such that the set of bearings allows the second disc to rotate in a single direction at a velocity independent of the wheel velocity after maximum velocity of the wheel has been attained.

19 Claims, 6 Drawing Sheets

BICYCLE WHEEL SPINNER ASSEMBLY

BACKGROUND

The present invention relates generally to wheel covers for bicycles, and more particularly to a multi-disc spinning assembly for bicycles and similar transportation means.

There has been an abundance of patents for hubcaps and spinning hubcaps for motorized vehicles. For example, see U.S. Pat. No. 3,158,946 to Upchurch, wherein a single disc hubcap is described that spins relative to the auto wheel to which it is attached, and continues to spin after the associated auto wheel stops moving. The rotation of this single disc hubcap is directed via a spring-pressed ratchet dog mechanism.

Other patents such as, for example, U.S. Pat. No. 5,490,642 to Rutterman et al., U.S. Pat. No. 5,659,989 to Hsiao et al., and U.S. Pat. No. 6,554,370 to Fowlkes, describe rotating auto hubcaps that maintain a rotational direction, free of the motion of an attached auto wheel via, a weight mechanism. Such a weight mechanism directs the hubcap's rotation direction whether the auto, and thus auto wheel, direction is forward or reverse.

U.S. Pat. No. 6,655,061 to Good and U.S. Published Patent Application No. 2004/0075332 to Good describe a single disc auto wheel hubcap assembly that controls the rotational momentum of an auto hubcap connected to an auto wheel via a bearing clutch, which allows rotational movement of the auto hubcap in only a single direction.

U.S. Pat. No. 4,121,851 to Finkenbiner describes a spinner for attachment to a bicycle. The spinner of Finkenbiner is positioned inside the hub and spokes of a typical bicycle wheel using a resilient band. As the wheel hub rotates, the difference in frictional force between the resilient band and the hub should carry the spinner to turn synchronously with the hub, and not spin independently of the bicycle wheel and hub.

The commercialization and popularity of automotive hubcaps rotating independently of the attached automotive wheel has increased dramatically, primarily cultivated by the popularity of such novelties in music videos and lifestyles of popular music icons. However, the commercialization of such an item is not attainable by a certain segment of the population, namely, the segment of the population without access to or ability to drive their own automobile.

Thus, what is desired is a multi-disc spinner assembly as a hubcap for a bicycle such that one of the disks attaches to a bicycle wheel and moves in conjunction with the attached bicycle wheel. Another one or more disks of the multi-disc assembly move in the direction of the spinning wheel and continue to rotate independently after the motion of the bicycle wheel has ceased.

SUMMARY OF THE INVENTION

A multi-disc spinning assembly for a bicycle comprising a narrow flange hub, a first disc, a second disc and an independently rotating means. The narrow flange hub supports a wheel. The first disc comprises a series of brackets around the periphery of a backside of the first disc for mounting the first disc to a rim of the wheel; and one or more openings. The second disc is located between the first disc and a flange of the narrow flange hub. The independently rotating means connects to the second disc and the narrow flange hub, such that the independently rotating means allows the second disc to rotate in a single direction at a velocity independent of the wheel velocity after maximum velocity of the wheel has been attained.

BRIEF DESCRIPTION OF THE DRAWINGS

The various exemplary embodiments of the present invention, which will become more apparent as the description proceeds, are described in the following detailed description in conjunction with the accompanying drawings, in which.

DETAILED DESCRIPTION OF THE INVENTION

The exemplary embodiments of the present invention comprise a multi-disc spinner assembly for a bicycle to give the visual illusion that the wheels of the bicycle are moving faster than they truly are.

Figure 1:
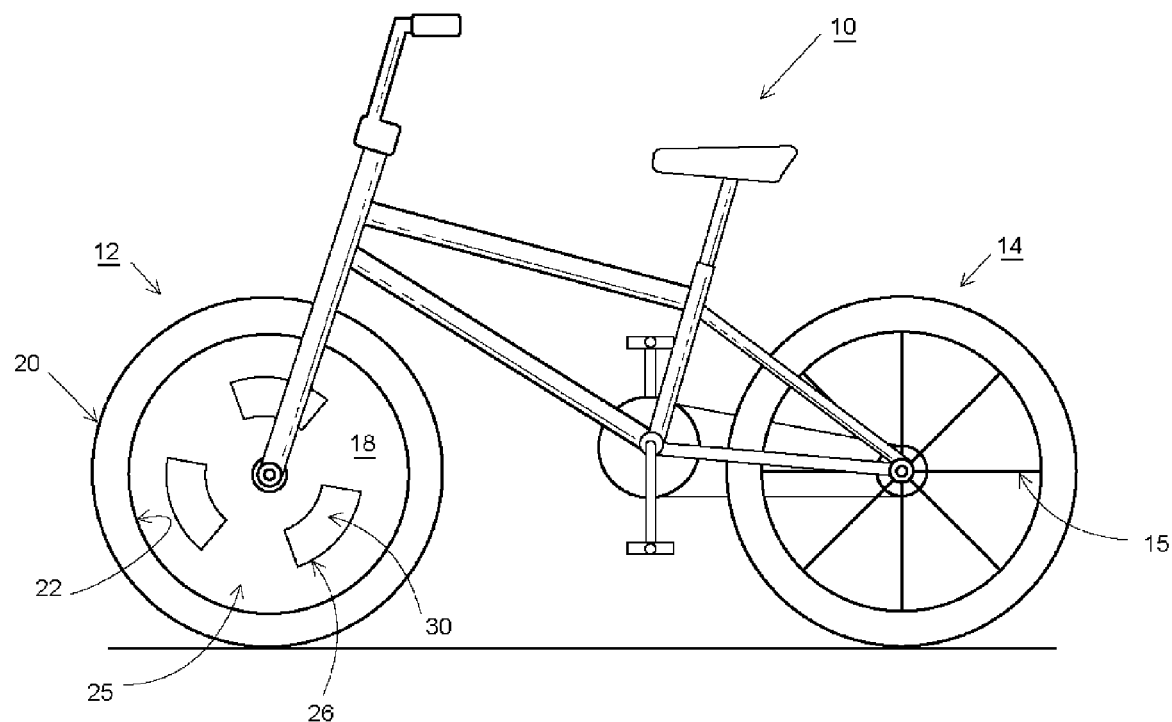
FIG. 1 is an illustration of an elevation view of a typical bicycle accessorized with the multi-disk spinner assembly according to the various exemplary embodiments of the present invention.
Figure 2:
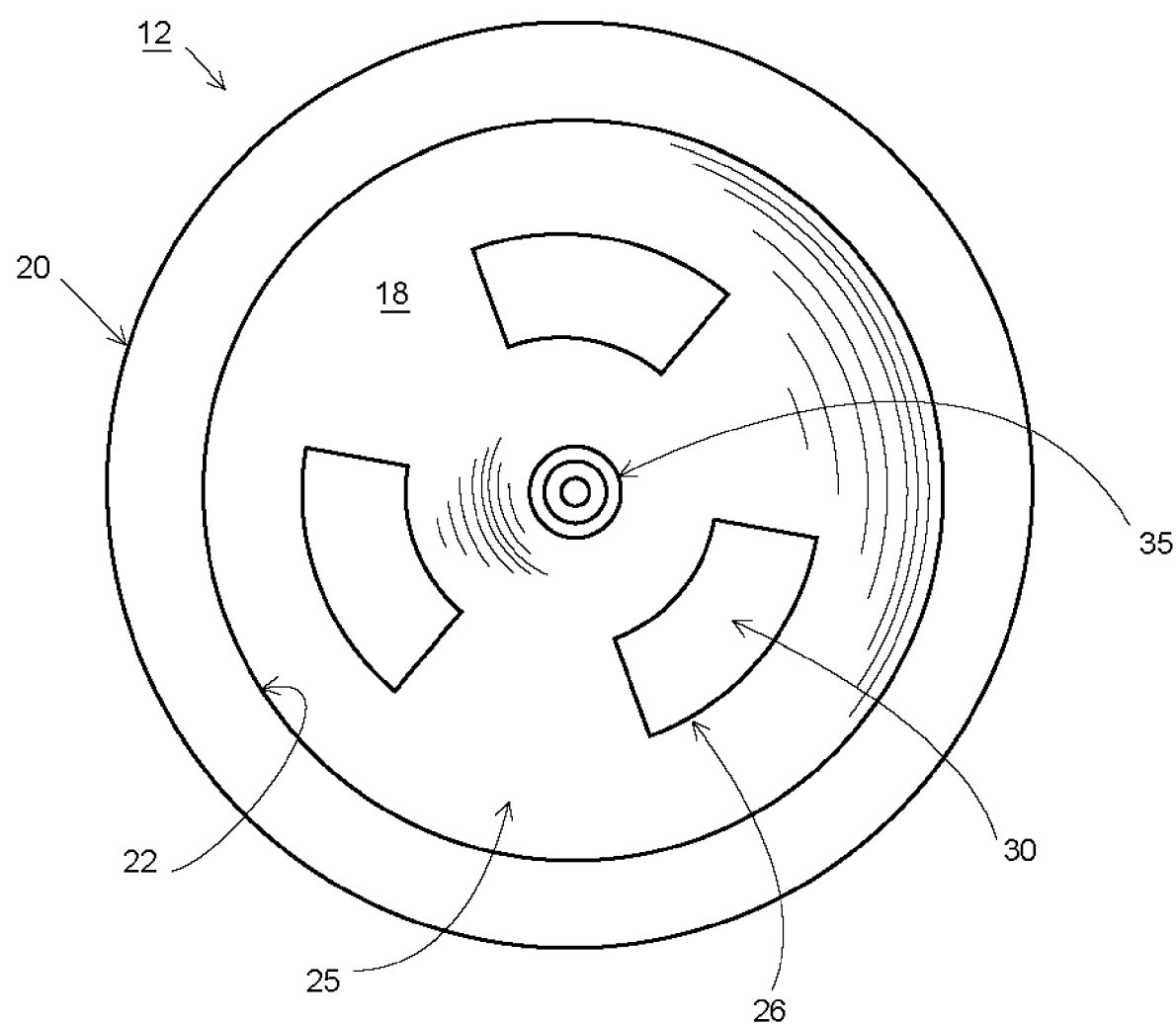
FIG. 2 is an illustration of an elevation view of a typical bicycle wheel accessorized with the multi-disk spinner assembly according to the various exemplary embodiments of the present invention.

FIG. 1 presents an illustration of a standard bicycle 10 having attached to a front wheel 12, an exemplary embodiment of a multi-disc spinner assembly 18 according to the exemplary embodiments of the present invention. The rear wheel 14 shows a typical bicycle wheel without the multi-disc spinner assembly 18 according to the exemplary embodiments of the present invention. In this exemplary embodiment, wheel spokes 15 of the rear wheel 14 are clearly visible as such spokes usually are on a bicycle.

The exemplary embodiment of the multi-disc spinner assembly 18 shown in FIG. 1 rests outside of the spokes (not shown) of the front wheel 12. Thus, the spokes of the front wheel 12 are not visible in this embodiment. However, depending on the size and open spaces 26 of the discs of the multi-disc spinner assembly, the spokes of the wheel may be visible.

The multi-disc spinner assembly 18 embodiment of FIG. 1 comprises a first disc 25 and a second disc 30. The first disc 25 is mounted to the rim 22 of the bicycle. The tire 20 is mounted to the rim 22.

Figure 3:
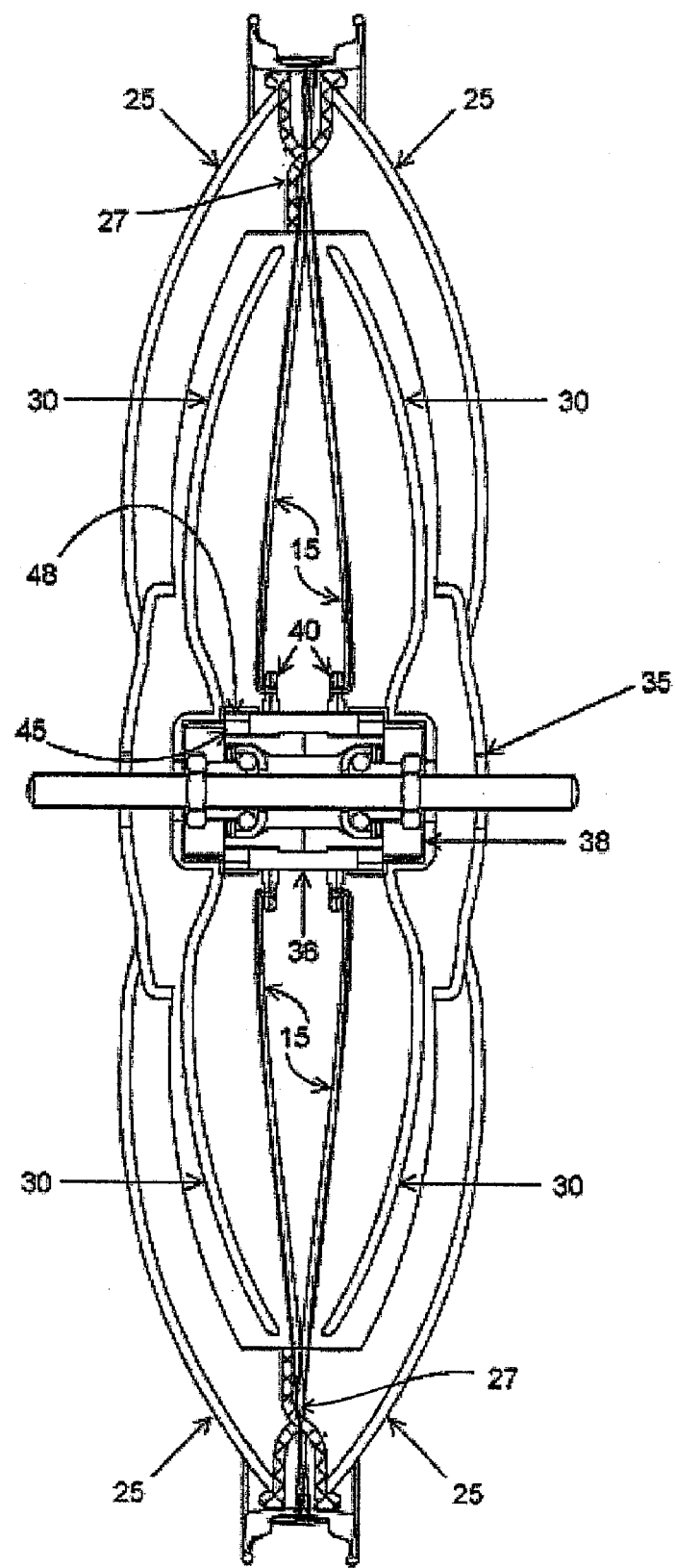
FIG. 3 is an illustration of an elevation partial section view of the multi-disk spinner assembly according to the various exemplary embodiments of the present invention.
Figure 4:
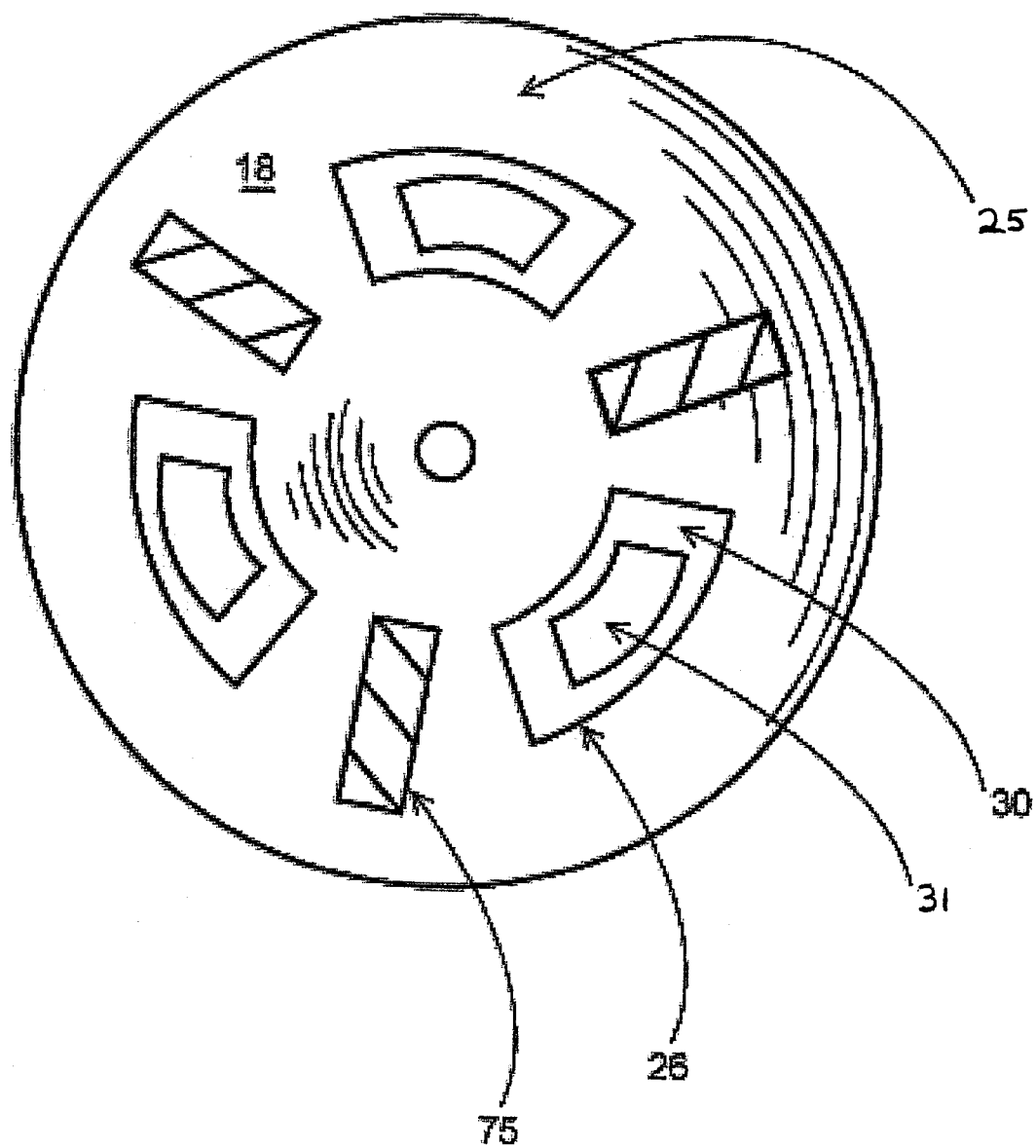
FIG. 4 is an illustration of an elevation of the multi-disk spinner assembly according to the various exemplary embodiments of the present invention.

The description herein describes the first disc and second disc as single individual components of the multi-disc assembly. However, it should be understood, based on the drawings and description, that a bicycle wheel comprising the various exemplary embodiments of the present invention may comprise a single first disc and a single second disc on one side of a bicycle wheel. The bicycle wheel may also comprise a pair of first discs and a pair of second discs such that the pair of first discs are on the outer opposite sides of a bicycle wheel and the pair of second discs are on opposite sides of a bicycle wheel and located between the pair of first discs and a center of the bicycle wheel. See, for example, FIG. 3.

As the first disc 25 is mounted to the rim 22, the first disc rotates as the wheel rotates on the bike. In a preferred embodiment, the first disc is mounted to the rim by a series of brackets 60 on a periphery of a back side 27 of the first disc. That is, the first disc moves at the same relative velocity as the rim and tire of the bike. Thus, as the wheel stops, the first disc stops rotating as well.

In between the first disc 25 and the spokes (not shown) of the front wheel 12 is a second disc 30. The first disc 25 comprises open spaces 26 through which the second disc 30 is visible. In a preferred embodiment, the second disc 30 may comprise second open spaces 31.

According to the exemplary embodiments of the present invention, the second disc 30 rotates independently of the rotation of the wheel of the bicycle. In a preferred embodiment, the second disc rotates in the direction of the wheel rotation and at the same velocity as the wheel as the wheel accelerates. When the velocity of the wheel decreases, the second disc may rotate independently of the wheel itself.

That is, for example, if the wheel reaches a top velocity of 25 miles per hour (MPH), the first disc and the second disc would be rotating at a velocity of 25 MPH. However, if the bicycle then dropped to 15 MPH, the first disc would also drop to a velocity of 15 MPH as the first disc is fixed to the rim of the wheel and thus rotates at the same velocity as the wheel and rim. The second disc, however, may continue to rotate at a greater velocity as the second disc spins independently when the velocity of the wheel decreases and the second disc has built up momentum. Therefore, in this example, the second disc could still be spinning at 25 MPH or a value possibly between 15 MPH and 25 MPH.

Figure 5:
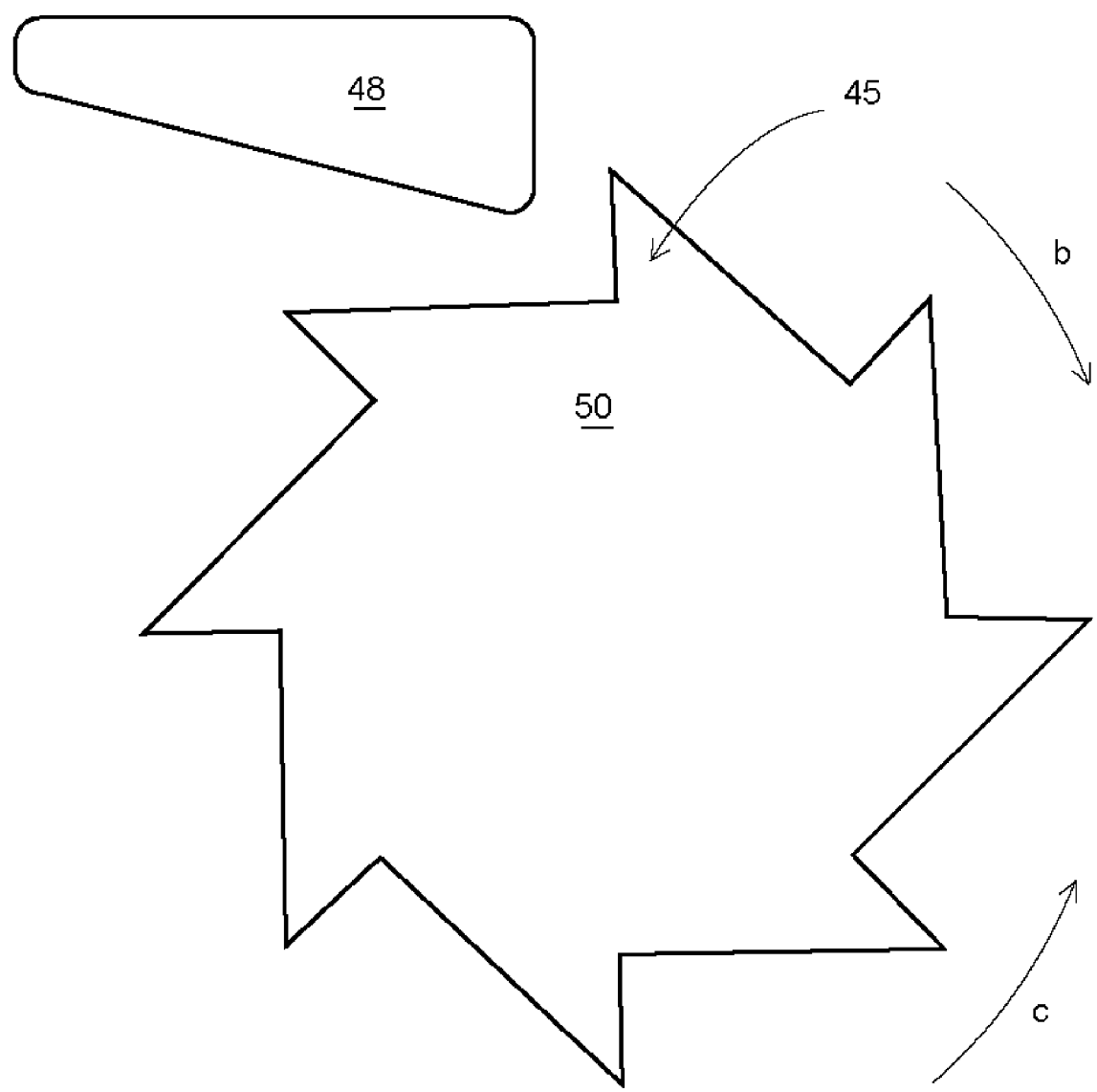
FIG. 5 is an illustration of a pawl and catch assembly according to the various exemplary embodiments of the present invention.
Figure 6:
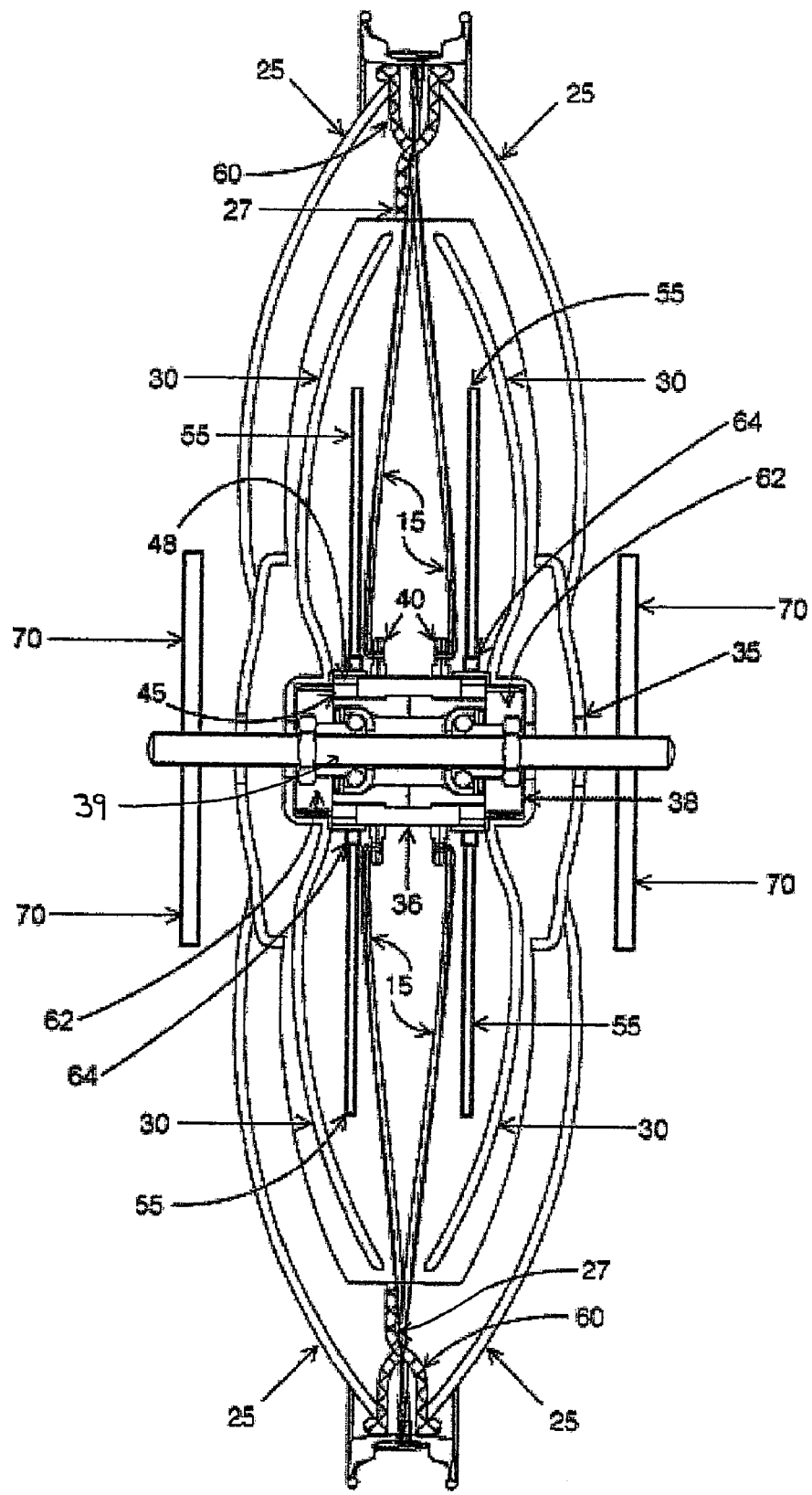

The second disc is preferably connected to an independent rotating means. In an exemplary embodiment, the independent rotating means is a pawl 48 and catch 45 mechanism 50 as represented in FIG. 5. In practical operation, as the bicycle wheel rotates in a forward direction, the first disc 25 and the second disc 30 rotate forward. As the second disc 14 rotates forward, the pawl and catch are locked. That is, the pawl 48 rests in one of the one or more catches 45 encircling a bicycle hub.

The multiple catches are in a fixed position encircling the hub of the bicycle wheel. There may be one catch or there may be any multiple number of catches sounding the bicycle wheel hub. As the wheel rotates forward, the one or more catches rotate at the substantially same velocity as the bicycle wheel. As the catches rotate, the pawl 48 attached to the second disc gets caught in and rests in one of the one or more catches. Thus, pawl, and thereby the second disc, is pushed in the forward rotation of the one or more catches at substantially the same velocity as the one or more catches. As the wheel, and thus, the one or more catches, decreases in forward velocity, shown as direction b, the second disc may continue to rotate in a forward direction based on the built up momentum of being pushed by the one or more catches. The second disc may continue to spin at a faster velocity than the slowed wheel because the pawl may slide over the one or more catches since the one or more catches face only in one direction.

The pawl and catch mechanism according to the exemplary embodiments of the present invention allows independent movement of the second disc in one direction of rotation. That is, as the acceleration and velocity of the wheel in direction b decreases, the second disc can continue to spin faster than the wheel in direction b. However, in the situation wherein the wheel is rotating in a direction c, the pawl attached to the second disc likely would not catch on one of the one or more catches and thus would not be driven at the same velocity as the wheel and first disc. As such, the second disc would likely not build up momentum in a direction c and would not likely spin at a velocity equal to or greater than the rotation of the wheel and first disc.

In the exemplary embodiments according to the present invention having a pair of second discs, the multi-disc spinning assembly further comprises a pair of independent rotating means. The pair of independent rotating means is preferably located between the pair of second discs and the pair of flanges of the narrow flange hub. The pair of independent rotating means allows rotation of the pair of second discs in a single direction, for example, a direction of forward motion of the bicycle.

In another exemplary embodiment of the present invention, the independent rotating means is a conventional bearing 62, typically of the sort having roller or needle bearings to restrict rotation in a single direction.

In the various exemplary embodiments of the present invention, the multi-disc spinner assembly may comprise more than a first disc and a second disc. A third disc 55 may reside between the second disc and the flange of the narrow flange hub. In the exemplary embodiment comprising a pair of third discs, the pair of third discs may reside between a pair of second discs and a pair of flanges of the narrow flange hub.

A third disc of the various exemplary embodiments may be firmly attached to the bicycle wheel hub such that the third disc moves with substantially the same velocity as the bicycle wheel and the first disc. The second disc, preferably comprising openings through which one may visually observe the third disc, may then spin independent between the first disc and the third disc.

In another of the various exemplary embodiments according to the present invention, the third disc may be attached to a second independently rotating means, i.e, a second pawl and catch mechanism 64 similar to that described above with regard to the second disc. In such an exemplary embodiment, the third disc rotates independently of the bicycle wheel, the first disc and the second disc.

Another exemplary embodiment comprises one or more outer discs 70 outside of the first disc, that is, further from a center of the wheel than the first disc. The one or more outer discs may move in conjunction with the bicycle wheel and first disc or independently in a manner substantially similar to that described above for the second disc and third disc.

The various exemplary embodiments of the present invention may comprise any number of discs. It is preferred that there be at least two discs and fewer than five discs.

The discs of the exemplary embodiments of the present invention are preferably a lightweight durable material such as an injection molded plastic, vacuum molded plastic, aluminum, and combinations thereof. Plastic comprising the discs may be coated with paint, sealer, reflective materials 75, stickers, and the like.

In a preferred embodiment, the discs are coated with a reflective coating to give the visual appearance of a nickel or chrome plated material such as, for example, a hubcap on an automobile.

In another embodiment, the discs are coated with a predetermined design comprising one or more colors.

In the various exemplary embodiments of the present invention, a narrow flange hub comprises the hub of a bicycle. The narrow flange hub comprises two substantially equally sized flanges 40 resting at a substantially equal distance from a center 36 of the hub 39. The flanges rest at a closer distance to the center of the hub than a typical bicycle. Decreasing the distance of each of the flanges from the center of the hub increases an amount of space between each flange and an outer edge 38 of the hub 39. Increasing the amount of space between each flange and the outer edge provides the space for the multi-disk spinner assembly according to the various exemplary embodiment of the present invention.

In the various exemplary embodiments of the present invention, the first disc comprises an opening near the wheel rim to permit access to the tire air valve (not shown).

The first disc of the exemplary embodiments of the present invention may comprise a substantially center hole 35 such that the hub may extend out and through the first disc. Additional bicycle accessories, such as, for example, pegs for standing and tricks, could then be attached to the hub without interference on the part of the first disc.

The multi-disc spinner assembly according to the present invention fits any standard and specialized bicycle rim sizes. Further, the multi-disc assembly fits the front and rear wheels of a bicycle without interruption to the pre-existing gear and brake mechanisms of the bicycle.

In the various exemplary embodiments, it is preferred that the second disc have a smaller diameter than the first disc. A third disc, if present, preferably would also then have a smaller diameter than the second disc.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention.

What is claimed is:

1. A multi-disc spinning assembly for a bicycle comprising:
   a narrow flange hub, wherein the narrow flange hub supports a wheel;
   a first disc, wherein the first disc comprises
      a series of brackets around the periphery of a back side of the first disc for mounting the first disc to a rim of the wheel; and
      one or more openings;
   a second disc, wherein the second disc is located between the first disc and a flange of the narrow flange hub; and
   an independently rotating means connected to the second disc and the narrow flange hub, wherein the independently rotating means allows the second disc to rotate in a single direction at a velocity independent of the wheel velocity after maximum velocity of the wheel has been attained.

2. The multi-disc spinning assembly according to claim 1, wherein the independently rotating means comprises a pawl and catch mechanism, wherein the pawl is connected to the second disc and the catch mechanism is connected to the narrow flange hub and comprises one or more catches.

3. The multi-disc spinning assembly according to claim 1, wherein the independently rotating means comprising a bearing clutch.

4. The multi-disc spinning assembly according to claim 1, further comprising a third disc located between the second disc and the flange of the narrow flange hub.

5. The multi-disc assembly according to claim 4, wherein the third disc rotates at a substantially similar velocity as the wheel and first disc.

6. The multi-disc assembly according to claim 5, further comprising a second independently rotating means connected to the third disc and the narrow flange hub, wherein the second the independently rotating means allows the third disc to rotate in a single direction at a velocity independent of the wheel velocity after maximum velocity of the wheel been attained.

7. The multi-disc spinning assembly according to claim 1, wherein the second disc comprises one or more openings.

8. The multi-disc spinning assembly according to claim 1, further comprising one or more outer discs located on a side of the first disc furthest away from a center of the wheel.

9. The multi-disc spinning assembly according to claim 1, wherein the first disc has an opening a center such that the narrow flange hub may extend through the first disc.

10. The multi-disc spinning assembly according to claim 1, wherein the first disc and second disc are comprised of plastic.

11. The multi-disc spinning assembly according to claim 1, wherein the first disc and the second disc are coated with a material to visually appear like an automobile hubcap.

12. The multi-disc spinning assembly according to claim 1, wherein a reflective safety material is applied to one or more of the first disc and second disc.

13. The multi-disc spinning assembly according to claim 1, wherein the second disc rotates independently in a single direction.

14. The multi-disc spinning assembly according to claim 1, wherein the first disc is located between the narrow flange hub and a gear assembly and brake assembly of the bicycle.

15. The multi-disc spinning assembly according to claim 1, wherein the second disc has a smaller diameter than the first disc.

16. The multi-disc spinning assembly according to claim 15, wherein the pair of independently rotating means comprises a pawl and catch mechanism, wherein the pawl is connected to the second disc and the catch mechanism is connected to the narrow flange hub and comprises one or more catches.

17. The multi-disc spinning assembly according to claim 15, wherein the pair of independently rotating means comprising a pair of bearing clutches.

18. The multi-disc spinning assembly according to claim 15, further comprising a pair of third discs located between the pair of second discs and the pair of flanges of the narrow flange hub.

19. A multi-disc spinning assembly for a bicycle comprising:
   a narrow flange hub, wherein the narrow flange hub supports a wheel and the narrow flange hub comprises a pair of flanges substantially equidistant from a center of the wheel;
   a pair of first discs, wherein the pair of first discs comprises
      a series of brackets around the periphery of a back side of the pair of first discs for mounting the pair of first discs to a rim of the wheel; and
      one or more openings;
   a pair of second discs, wherein the pair of second discs is located between the pair of first discs and the pair of flanges of the narrow flange hub; and
   a pair of independently rotating means connected to the pair of second discs and the narrow flange hub, wherein the pair of independently rotating means allows the pair of second discs to rotate in a single direction at a velocity independent of the wheel velocity after maximum velocity of the wheel has been attained.

* * * * *